Feb. 6, 1951 J. AICARDI 2,540,413

RADIO GUIDANCE SYSTEM FOR MOBILE CRAFT
USING AUTOMATIC HOMING CORRECTION

Filed May 8, 1945 5 Sheets-Sheet 1

INVENTOR
JOSEPH AICARDI,
By Richard S. Dall
ATTORNEY

Feb. 6, 1951

J. AICARDI

RADIO GUIDANCE SYSTEM FOR MOBILE CRAFT USING AUTOMATIC HOMING CORRECTION 2,540,413

Filed May 8, 1945

5 Sheets-Sheet 2

INVENTOR

JOSEPH AICARDI, by Richard S. Ouell

ATTORNEY

INVENTOR
JOSEPH AICARDI,
Richard S. Ould
ATTORNEY

INVENTOR
JOSEPH AICARDI,
by Richard S. Onla
ATTORNEY

Feb. 6, 1951 J. AICARDI 2,540,413

RADIO GUIDANCE SYSTEM FOR MOBILE CRAFT USING AUTOMATIC HOMING CORRECTION

Filed May 8, 1945 5 Sheets-Sheet 5

INVENTOR
JOSEPH AICARDI,
by Richard S. Ould
ATTORNEY

Patented Feb. 6, 1951

2,540,413

UNITED STATES PATENT OFFICE 2,540,413

RADIO GUIDANCE SYSTEM FOR MOBILE CRAFT USING AUTOMATIC HOMING CORRECTION

Joseph Aicardi, Versailles, France, assignor to Sadir-Carpentier, Paris, France, a joint-stock company of France Application May 8, 1945, Serial No. 592,640
In France October 12, 1944

12 Claims. (Cl. 343—107)

The present invention relates to improvements in methods and systems for guiding moving bodies such as aircraft by radio.

It is well known that in blind landing systems such as are employed at airports, a landing radio-beacon is used to radiate a beam for defining a landing path axis functioning in such a manner that the airplane radio receiver receives on both sides of the beacon axis different radio signals which are easily distinguishable, thus enabling the airplane operator to locate the airplane with respect to the beacon axis. Said different signals can be characterized either by their form as, for instance, thru transmitting complementary code signals such as dots and dashes, or by their modulation frequencies for a radio-beacon with a double modulation of two different frequencies.

Thus, according as the airplane or moving body is on one side of the beacon axis OX or on the other side its radio receiver receives a signal in which either the dot or the dash or one or the other of the two modulation frequencies $f^2$ or $f^1$ predominate.

When the airplane is on the beacon axis, both signals, dashes and dots, or both frequencies $f^1$ $f^2$ are received with the same intensity and the operator hears a continuous note, or both notes with the two different identifying frequencies $f^1$ and $f^2$ and with the same amplitude.

These radioguidance methods indicate to the pilot of the airplane on which side of the beacon axis he is located, but they do not define the control to be applied in order to bring the plane on to said axis.

The present invention has more particularly for its chief object to remedy said inconvenience and to indicate at every moment the direction which the moving body must follow in order correctly to come onto the axis of the radio-beacon.

For this purpose, the present invention relates to a method for guiding of moving bodies such as airplanes, in which there is used a radio-beacon defining a beacon axis OX, this method being characterized in that there are combined, at the receiver the following signal values (1) those obtained from the radio-beacon and characterizing the momentary position of the aircraft or moving body, and (2) those characterizing the course being traversed by the aircraft or moving body with respect to the direction of the radio-beacon. The resulting combined value indicates without ambiguity the direction which the aircraft or moving body must follow in order correctly to come onto the axis of said radio-beacon.

According to one form of embodiment of the invention, the observed signal characterizing the course of the moving body with respect to the direction of the radio-beacon is added to or subtracted from the observed signal characterizing the position of the moving body with respect to the axis of the radio-beacon according to the phase of the signal characterizing the course of the moving body, said phase indicating whether the course or heading of the moving body is directed towards the right or towards the left of the radio-beacon, so as to take into account the direction of said course and to cause a correction which is greater or smaller according as the moving body comes nearer to said beacon axis more or less rapidly.

The invention covers said method irrespectively of the apparatus used for carrying out the same. However, I provide apparatus permitting a particularly simple and efficacious carrying out of the preceding method.

The method according to the invention and apparatus for carrying out the same are shown by way of example in the appended drawings in which.

According to the method which forms the subject matter of the present invention the position indications given by the radio-beacon system are combined with the indications representing the heading of the airplane with respect to the direction of the radio-beacon.

Figure 1:
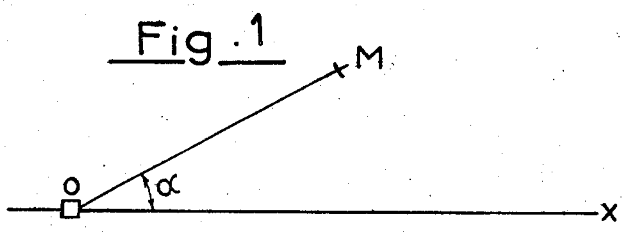
Figures 1 and 2 are charts employed for the purpose of explaining the operation of this invention.

It is well known that with radio-beacons in which complementary code signals are received together, as for instance dots and dashes, the operator on board of the moving craft obtains a detected current having the frequency $f$ of the modulation of the transmitter and the amplitude of which varies at the cadence dots-dashes, the amplitude being greater during transmission of dots for the points on one side of the beacon axis and during the transmission of dashes for points on the other side of the beacon axis. For points on the beacon axis, the amplitude remains constant, which gives, when heard, the sensation of a continuous very long dash or unkeyed signal. For a given point the amplitude difference between the observed dots and the dashes increases with the angle $\alpha$ (Figure 1) which the direction OM from the beacon O makes with the beacon axis OX in a manner which is substantially linear so long as $\alpha$ is small.

On the other hand, it is well known that when one alternately uses on board of a moving body (as an airplane, for instance) for receiving radio signals, either two directional antennae or two combinations of antennae having different directivity patterns, both antennae (or both combinations) having identical properties in the direction of the axis of the airplane, the current supplied by the receiver varies at the rate of the alternation of connection of the two antennae, except when the airplane is moving directly towards the beacon transmitter.

More particularly, it is known that such a device can be obtained by using the combination of a non-directional antenna with a directional coil aerial perpendicular to the axis of the airplane and by periodically reversing the direction in which said combination is made, for instance by reversing the phase of the electromotive force of the coil aerial, so that the electromotive forces induced in the coil aerial and in the non-directional antenna are alternately in phase and in opposition.

Under these conditions, the current delivered by the receiver varies in amplitude at rate of the reversal of the connections of the coil aerial, said variation of amplitude increasing in proportion as the angle B (Figures 2 and 5), which the heading of the airplane at M makes with the direction MO of the beacon transmitter and having opposite directions for two headings $MM^1$ and $MM^2$ directed on respective sides of the line MO, increases.

According to the present invention, the reception of the radio-beacon signal is effected with a device of the kind which has been above referred to and the variations of amplitude of received current due to the effect of the variation of the course of the moving body are combined with the variations of received current due to the position of the airplane with respect to the axis of the radio-beacon, so that the combined course indicator reads zero not when the airplane is on the beacon axis, but when at any point it is taking the suitable course for correctly getting onto said beacon axis.

Under these conditions, the position of the pointer of the visual indicator changes as soon as the heading or bearing of the airplane is modified; the deviation of the pointer (for the airplane at M) (Figure 2) diminishing in proportion as the axis of the airplane inclines towards the left and becoming zero for a given inclination which is a function of the position of the airplane at M (or, more exactly a function, of the angle MOX) after which it changes its direction if said inclination is exceeded.

For getting onto the beacon axis it is then sufficient for the pilot to handle the plane so as to render and maintain at zero the deviation of the instrument pointer. In proportion as the plane M comes nearer to the beacon axis OX the instrument deviation due to the signal of the radio-beacon diminishes. For maintaining at zero the deviation of the pointer it is necessary to diminish the effect due to the orientation of the plane with reference to the direction of the beacon transmitter. This results in a diminution of the deviation of this orientation, and the course of the plane is brought to coincide with the direction of the axis of the radio-beacon.

Of course, the rapidity with which the plane gets on the beacon axis OX depends on the manner in which the component effects are combined and measured.

The phase reversal of the connections of the coil aerial can be obtained by means of an electronic change-over switch the reversing frequency $f'$ of which is much smaller than the modulation frequency $f$ of the waves transmitted by the radio-beacon.

With this device, the detection of the received oscillations causes signals to appear having the modulation frequency $f$ and having an amplitude varying at the keying of the dots and dashes; the amplitude of the dots is greater or smaller than that of the dashes according to the side of the beacon axis where the airplane is located. Furthermore, the amplitudes of said signals are modulated at the reversing frequency $f'$ thru the phase reversing device of the coil aerial. The extent of this variation is the greater in amplitude the more the heading of the airplane diverges from the direction MO of the beacon.

Figure 4:
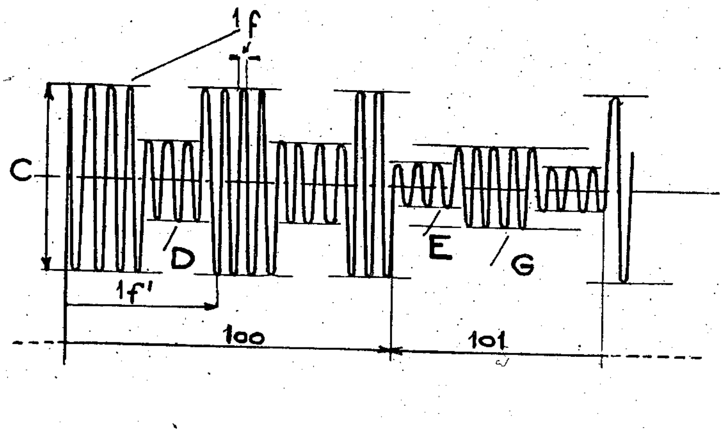
Figure 4 illustrates the wave form of the oscillations received by cyclically alternately connecting two different combinations of receiving antennae when the axis of the radio-beacon is defined by the transmission of complementary signals such as dots and dashes.

Thus, as shown in Fig. 4, the amplitude of the signal impulses of the modulation frequency $f$ during the reception of a dash 100 will be for example C for the zero phase connection of the coil aerial, and D for the 180° phase connection of the coil aerial. The alternately effective values C and D are produced at the reversing frequency $f'$, during the entire duration of the dash 100. The successive repetition of the amplitudes C and D of the oscillations of modulation frequency $f$ is effected at this repetition reversing frequency of $f'$ cycles per second.

The reception of dot 101 shown in Fig. 4 which immediately follows that of dash 100, first gives for the 180° phase of the connection of the coil aerial, an amplitude E which is smaller than amplitude D if the airplane is on the "dash"-side of the axis. For the zero phase of the connection of the coil aerial a signal amplitude G is obtained and this amplitude is with respect to amplitude C, for the dash, like E amplitude is with respect to amplitude D.

The so received signals are detected in both of the following independent manners:

(*a*) Said signals are rectified in order directly to obtain a continuous voltage which varies at the keying rate of the dots and dashes, which voltage is caused to act on a visual indicator, the value and the direction of the variation depending on the position of the plane with respect to the beacon axis.

(b) Said signals are detected and one obtains an alternating current having the reversing frequency $f'$, said current being the greater for a given position of the airplane the more the heading diverges from the direction of the beacon transmitter but also varying itself in amplitude at the keying rate of the dots and dashes.

By means of a change-over switch, preferably employing electron tubes, synchronized with the change-over switch for the receiving coil aerial the phase of said detected current of reversing frequency $f'$ may be determined. Said phase characterizes at a given moment the side on which the beacon transmitter lies with respect to the heading of the airplane. Indeed, the current of reversing frequency $f'$ becomes zero when the airplane is directed exactly according to the line MO and takes values which are equal but the phases of which differ from $\pi$ when the plane takes one of two headings $MM^1$ and $MM^2$ symmetrical with respect to the line MO shown in Figure 2.

Thus, there are involved:

(a) A code signal direct current the intensity of which varies at the keying rate of the dots and dashes while the relative value of the dot and dash for the periodical variation depends on the position of the airplane with respect to the axis of the radio-beacon;

(b) A current of a reversing frequency $f'$ the amplitude of which depends on the divergence of the heading of the airplane from the momentary direction of the radio-beacon of the airplane and the phase of which depends on the sense of said divergence. The amplitude furthermore undergoes at the keying rate of the dots and dashes periodical variations which are proportional to that of the current mentioned in preceding paragraph (a).

By rectifying said alternating current of frequency $f'$ there is obtained a continuous current the value of which is proportional to the amplitude of the alternating current and variable at the keying rate of the dots and dashes.

The first continuous current characterizes the position of the airplane with respect to the radio-beacon and the second rectified current characterizes the heading of the airplane and these currents are caused simultaneously to act upon the indicating apparatus.

Figure 2:
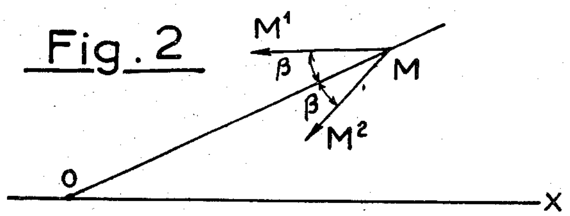

If the airplane M is on the heading $MM^1$ shown in Figure 2 it is necessary in order to cause the airplane to rejoin the true route to correct the heading of the airplane by an angle which is much greater than if the airplane is on the heading $MM^2$. In order to take this fact into account the second current (b) is added to or subtracted from the first one (a) according to the phase or sense of the second current (b) as determined by whether the course $MM^1$ or $MM^2$ of the plane is being followed.

When the airplane is on the heading $MM^1$ both currents are added; if the airplane follows the course $MM^2$ the two currents are subtracted, since there is a phase reversal of the second current.

When there is employed a radio beacon with a double modulation of frequency $f^1$ and $f^2$ there are obtained at the output of the receiver two currents of frequencies $f^1$ and $f^2$, the amplitude of the current $f^1$ predominating on the one side of the beacon axis while the amplitude of the current $f^2$ predominates on the other side.

If the same coil antenna device with a periodical phase reversal of the coil aerial at the frequency $f^1$ is used as in the previous case for the reception of said signals, currents of frequency $f^1$ and $f^2$ will furthermore be modulated with the reversing frequency $f'$.

These two currents $f^1$ and $f^2$ are then separated and each of them is detected in both above indicated manners, the first detection giving for each of them a direct current which is a function of the position of the airplane with respect to the axis. The second detection gives for each of the currents $f^1$ and $f^2$ an alternating current having the reversing frequency $f'$ of the phase of the connection of the coil aerial, the amplitude of said current varying with the heading of the plane.

The direct current obtained from the current of the frequency $f^1$ is greater or smaller than the direct current obtained from the current having the frequency $f^2$ according to the side of the beacon axis where the airplane is located. Therefore, the indicator apparatus such as a differential galvanometer in which both said currents would act alone would indicate thru the direction of deflection the side of the beacon axis where the aircraft is at the moment.

The alternating currents having the reversing frequency $f'$ are in the same relation as both direct currents, but their phase varies by 180° according as the beacon transmitter is on the right or on the left of the axis of the airplane.

According to the phase of the alternating currents having the reversing frequency $f'$ the rectified current obtained from the difference between the alternating currents of a reversing frequency $f'$ is added to or subtracted from the difference between the two direct currents acting on the differential galvanometer. The pointer must make it possible for the pilot of the craft to choose a suitable course for correctly getting back on the beacon axis.

In either of these radioguidance methods with combined signals or with a double modulation frequency, the effect characterizing the heading of the airplane is for a given position of the plane the greater the more the route of the plane is inclined to the direction of the transmitter from the plane. But this effect also depends for a given orientation of the heading on the position of the plane. Indeed in the radio-beacon using dot-dash signals the rectified current obtained from the current having the reversing frequency $f'$ undergoes a variation at the keying rate of the dot and dash proportional to the variation, at this rate, of the current having the modulating frequency $f$, that is to say in the neighborhood of the beacon axis proportional to the angular divergence between the plane and the axis of the radio-beacon.

In a radio-beacon system with a double modulation of the beacon signals, the difference between the two rectified currents obtained from the currents of a reversing frequency $f'$ coming from the two modulations $f^1$ and $f^2$ is proportional to the difference between the two currents respectively having the frequency $f^1$ and $f^2$ and, accordingly, proportional, in the neighborhood of the beacon axis, to the angular divergence of the heading of the airplane from the axis of the radio-beacon.

Specifically, in both cases, in the neighborhood of the beacon axis, that is to say for comparatively small angular divergences between the airplane position and the beacon axis, the total energy applied to the indicating apparatus results from:

(a) The "radio-beacon" effect which is proportional to the angular divergence MOX (Fig. 2), and (b) The "homing" effect which is proportional to effect (a) just mentioned for a given inclination of the route of the airplane to the direction of the beacon transmitter and which, on the other hand, varies in the same sense as said inclination.

Thus, the total effect is proportional to the angular divergence MOX (Fig. 2) so long as the inclination of the heading of the airplane to the line OM between the plane and the beacon transmitter keeps the same value.

Under the operating conditions just described, the heading to be followed by the airplane is defined by the zero value of the resultant combined observed value. With the arrangement just described, if said heading makes at M (Figure 5) the angle B with the line OM it must make the same angle everywhere, that is to say that the airplane thus describes a logarithmic spiral intersecting beacon axis OX according to the angle B. A logarithmic or equiangular spiral is the locus of a point moving along a curve with reference to a pole in such manner that at every point on the curve the tangent makes the same angle with the radius. Now, it is necessary that as the airplane comes nearer to the beacon axis OX, the angle B should diminish and be practically zero when the airplane comes on to the beacon axis OX.

For varying the angle B the voltages due to the angle B, i. e. the homing effect, are caused to vary automatically in proportion as the airplane comes nearer to the axis OX of the radio-beacon, that is to say in proportion as the radio-beacon effect diminishes.

According to another form of employing the method according to the present invention, the homing effect no longer depends on the angular position $\alpha$.

Owing to this fact, the homing effect remains fixed for a given bearing of the airplane irrespectively of the angular divergence of the plane with respect to the beacon axis. Thus, the radio-beacon effect, which is a function of the angular position $\alpha$, becomes in the neighborhood of the beacon axis OX very small with respect to the homing effect. This results in that the course traversed may have the beacon axis for an asymptote, i. e., it is too long, as a practical matter, in coinciding with said axis.

In order to remedy this inconvenience, the amplification of the homing effect is reduced when the airplane comes nearer to the beacon axis.

Figure 6:
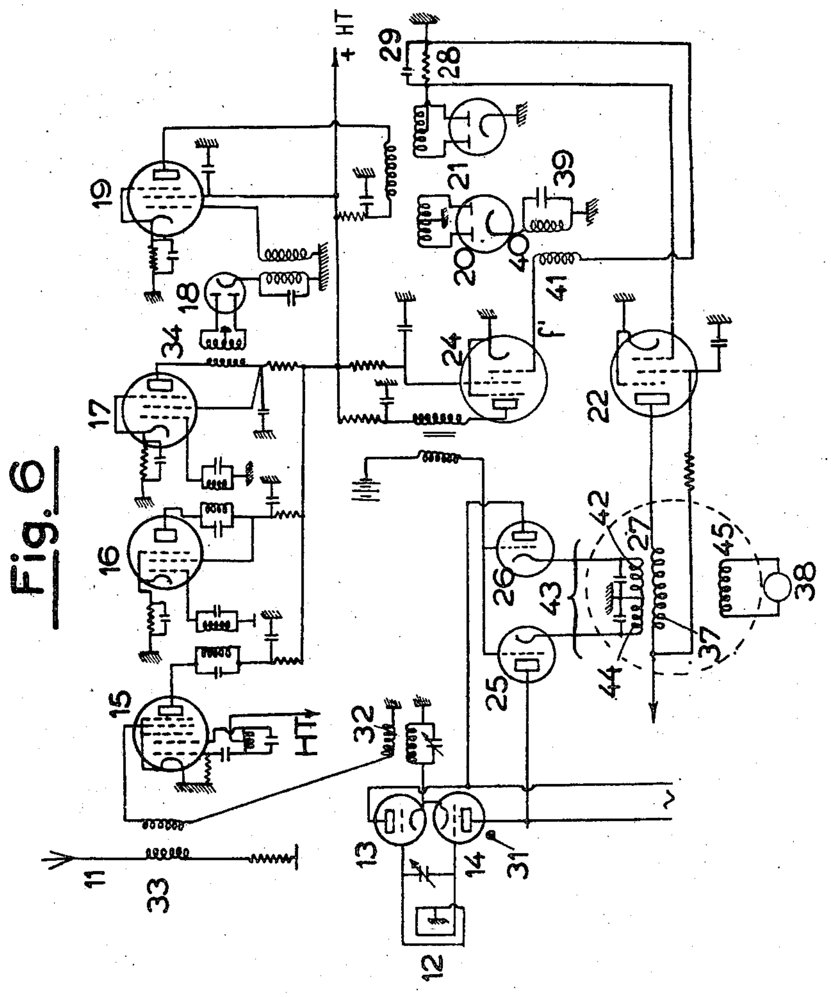
Figure 6 is a circuit diagram showing a radio apparatus embodying this invention.

Figure 6 shows a radioguidance system which is particularly suitable for carrying out the preceding methods.

This system works with a radio-beacon transmitting the complementary code dot and dash signals, as already explained.

It comprises, besides the radio-beacon O, the principal groups of units which are indicated below and which are mounted on the airplane M to be guided:

(1) The device collecting the transmissions of the radio-beacon, (2) The device for the reception and the double detection of the signals, and (3) The visual control device.

The device collecting the transmissions of the radio-beacon comprises an omni-directional antenna such as an aerial 11 and a directional aerial such as a coil antenna 12 turned so as to be perpendicular to the axis of the airplane.

The oscillations introduced into the coil aerial 12 are transmitted through the medium of an electronic change-over switch 31 employing two triodes 13 and 14, to the grid of a mixing tube 15 by means of the high-frequency transformer 32.

The anodes of the two triodes 13 and 14 which form the change-over switch are supplied by an alternating plate voltage having the reversing frequency $f'$. Thus, said triodes work alternately in turns and, accordingly, the phase of the oscillations is periodically reversed in the transformer 32.

On the other hand, the control grid of the tube 15 receives thru the high-frequency transformer 33 the oscillations induced in the non-directional antenna 11.

Thus, to the control grid of the mixing tube 15 there is applied, at the reversing frequency $f'$, a voltage which is alternately equal to the sum and to the difference of the electromotive forces developed in the coil aerial 12 and in the non-directional antenna 11.

Said high frequency voltage is amplified after a change of frequency by heterodyne action in the circuits of amplifier tubes 16 and 17. The voltage developed at the output of said amplification stages 16 and 17 is applied by a transformer 34 to the plates of a detector diode 18.

The voltage so detected with the modulation frequency $f$ is amplified in the tube 19. Said voltage is then again detected in the two diodes 20 and 21 simultaneously.

The anodes resistance 28 of the diode 21 is shunted by a capacitor 29 of proper value for short-circuiting the reversing frequency $f'$.

Owing to this fact there is directly collected at the ends of the resistance 28 a direct voltage variable at the keying rate of the dot and dash code.

This voltage characterizes the position of the airplane M with respect to the radio-beacon.

This voltage is then amplified by the tube 22 the plate circuit of which supplies the primary winding 37 of an output transformer 27 coupled with the indicating apparatus 38.

The cathode of the diode 20 is connected with the primary winding 39 of a transformer 40 tuned to the reversing frequency $f'$ and the secondary winding 41 of which is connected with the control grid of an amplifier tube 24. Thus said grid of tube 24 receives the voltage with the reversing frequency $f'$. Said voltage thus amplified by the tube 24 is transmitted by a suitable transformer to the two grids of the tubes 25 and 26 connected in parallel. The tubes 25 and 26 form an electronic change-over switch 43 working in synchronism at reversing frequency $f'$ with the change-over switch 31 by virtue of the connection of their anodes to a source of current supply of frequency $f'$.

According to the phase of the voltage of frequency $f'$ which is transmitted to the anodes of the tubes 25 and 26 one or the other of these two tubes 25 or 26 conducts current. The tube the anode voltage of which is positive at the same time as the grid voltage, for a suitably adjusted polarization voltage, will, of course, conduct current.

The output current delivered by the tubes 25 and 26 and interrupted at the reversing frequency $f'$, is supplied to the primary windings 44 and 42, respectively, of a transformer 27. The current for these windings is supplied either by the tube 25 or the tube 26, according to the phase of the current of reversing frequency $f'$ and also according to the bearing of the airplane with respect to the direction MO of the radio-beacon (Fig. 2).

The resultant magnetic field in the secondary winding 45 is according to the case the sum or the difference of the two primary magnetic fields. It varies, of course, in the same manner as both said magnetic fields and in the same proportion, at the dot-dash keying rate of the fields. The sudden variation of the magnetic field at the moment of the transmission of the dot or dash causes a high electromotive force to appear in the output secondary winding 45 which is the instrument input. The secondary winding 45 is connected with a galvanometer having a movable coil the response sensitivity of which varies according to the position of the moving coil so as to respond, in practice, only to the first of two impulses of opposite directions and very near to each other which are caused by the passage from the dash-reception to the dot-reception and then to the dash-reception again.

The coils 42 and 44 of the primary winding of the output transformer 27 to which are delivered the outputs of the two tubes 25 and 26, respectively, of the electronic change-over switch 32, are connected in such a manner that their magnetic fields act in opposite directions on the secondary winding 45 in combination with the primary winding 37.

Owing to this fact, the direction of the impulses of the pointer of the galvanometer 38 indicates the direction into which the airplane should be re-directed for proper navigation.

This galvanometer must have a sufficient inertia in order that it is practically non-responsive to the impulses of a reversing frequency $f'$ coming from the interruptions of the anode current supply of both tubes 25 and 26 or from the voltages of frequency $f'$ which could exist across the terminals of the plate resistance of the diode 21.

The coefficients of amplification of the amplifier tubes 22 and 24 can be varied in order to modify the relative action of the signals defining the angle B and the angular position $a$. Thus the rapidity with which the route followed by the airplane will rejoin the axis of the radio-beacon, when the impulses of the visual indicator 38 are maintained at a zero rate, is reduced. For this purpose, pentodes 22 and 24 having an adjustable coefficient of amplification can be used.

The relative value of the homing effect can advantageously be increased automatically when the radio-beacon effect diminishes. For this purpose, bias is applied to the control grid of the tube 24 as shown in the circuit diagram of Figure 7 which shows a modification applied to the system of Figure 6.

Figure 7:
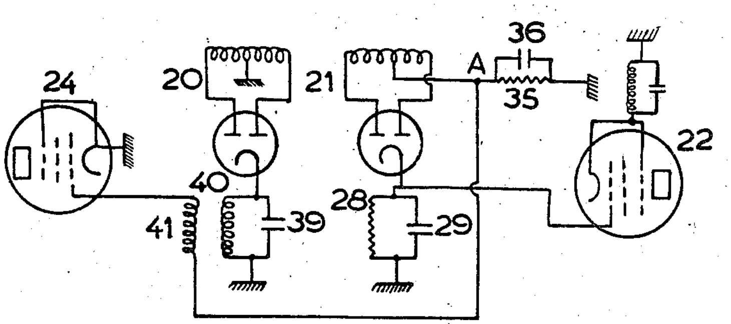
Figure 7 is a circuit diagram of an auxiliary circuit for the automatic increase of the effect of the variation of the course.
Figure 3:
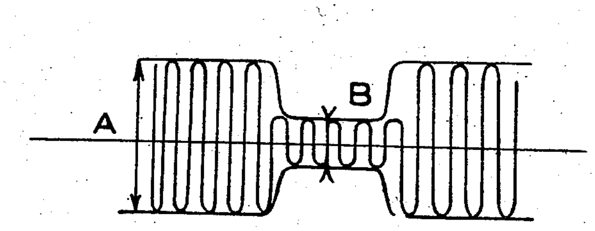
Figure 3 illustrates the wave form of the oscillations received by cyclically alternately connecting two different combinations of receiving aerials or antennae.

In Fig. 7, the diode 21 of the pair of detectors has in its plate circuit a resistance-capacity circuit 35, 36, the time constant of which is much longer than the period of the dot-dash keying of the signals of the radio-beacon. The negative voltage at the point A diminishes when the mean amplitude of the signals diminishes, that is to say when the airplane comes nearer to the beacon axis. Accordingly, the grid of the tube 24 is polarized less negatively. This results in an increase of the amplification. The homing effect is therefore increased.

Figure 8:
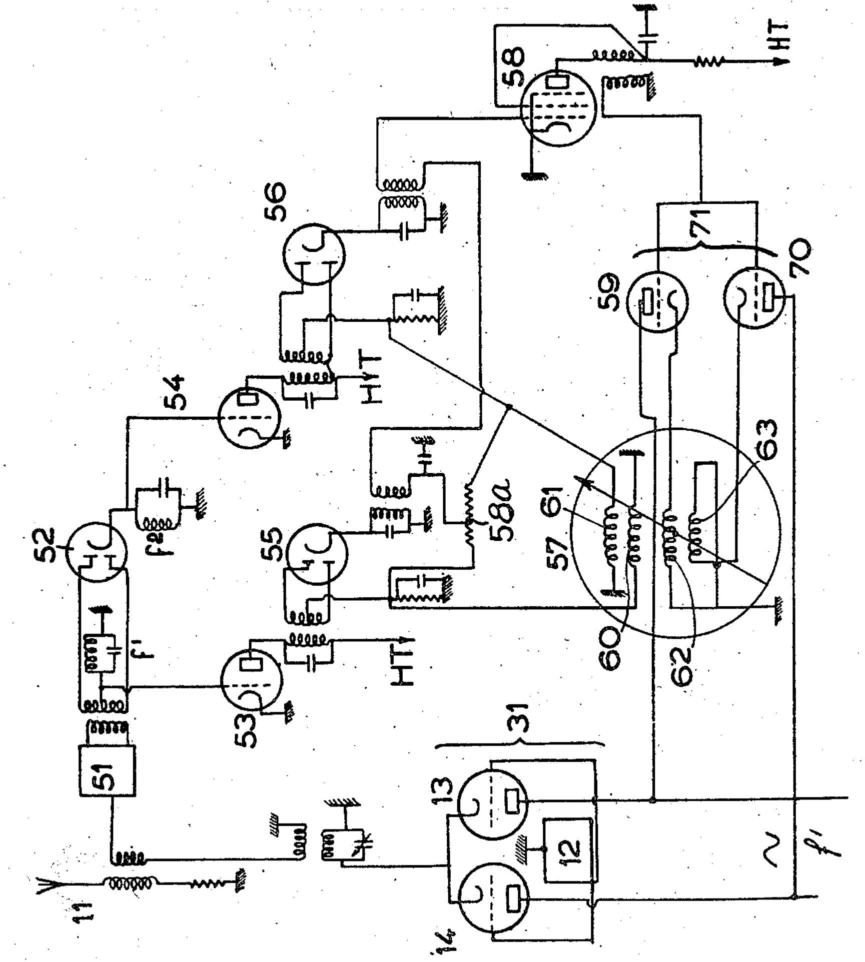
Figures 8 and 9 are circuit diagrams showing two other embodiments of a radioguidance system using a radio beacon double modulation.

Figure 8 shows another system for the carrying out of the methods according to the present invention, in which the radio-beacon which is used is a radio-beacon with a double modulation of frequency $f^1$ and $f^2$ of its respective sectors, working as already indicated.

It is known that in a radio-beacon with a double modulation, each side of the beacon axis is characterized by the predominance of one of the two frequencies of modulation $f^1$ and $f^2$, while the tones of these frequencies $f^1$ and $f^2$ have the same amplitude when the airplane is substantially on the beacon axis.

In reception, the system here employed also comprises, like the system shown in Figure 6, a non-directional antenna 11 and a coil aerial 12. The voltages induced in non-directional antenna 11 and in coil aerial 12 are applied to a mixing tube with heterodyning and with stages of amplification 51 through the medium of an electronic change-over switch 31 which first adds the coil aerial voltage and the non-directional antenna voltage and then subtracts the coil aerial voltage from the non-directional antenna voltage, this being effected at a reversing frequency $f'$.

The thus amplified voltage is detected by a diode 52. Two separate circuits tuned respectively to the frequencies of modulation $f^1$ and $f^2$ are connected one in the anode circuit and the other in the cathode circuit of the diode 52.

The so detected voltages $f^1$ and $f^2$ are amplified by the stages of amplification 53 and 54 and detected by the double diodes 55 and 56 respectively.

Each double diode 55 and 56 delivers, on the one hand, a direct voltage and, on the other hand, a voltage varying with the reversing frequency $f'$ that is to be amplified by the amplifier stage 58.

The direct voltage delivered by each diode 55 and 56 is applied to the winding 60 and to the winding 61 respectively of the multi-winding measuring instrument 57. The voltage with the reversing frequency $f'$ amplified by the amplifier stage 58 is applied to the grids of the two tubes 59 and 70 of an electronic change-over switch 71. This electronic change-over switch 71 works in synchronism with the electronic change-over switch 31 comprising the tubes 13 and 14 which periodically reverse the phase of the coil aerial currents in the input circuit of the mixer 51. The cathode circuits of the tubes 59 and 70 of the electronic change-over switch 71 are connected to the windings 62 and 63, respectively, of the measuring instrument 57.

Owing to this fact, rectified alternating voltage of frequency $f'$ of the amplifying stage 58 is supplied either to the winding 62 in the cathode circuit of the tube 59 or to the winding 63 in the cathode circuit of the tube 70 according to the phase of said voltage, that is to say according to the direction of the angular divergence between the heading of the plane and the direction of the radio-beacon from the plane.

This rectified current acts in combination with the direct currents flowing thru the coils 60 and 61 upon the pointer of the measuring instrument 57, which is a galvanometer, in one direction or in the other according to the direction of this angular divergence between the heading of the plane and the direction of the beacon.

In this system the rectified current flowing thru the windings 62 or 63 of the galvanometer 57 is proportional to the difference of amplitude of the currents of frequencies $f^1$ and $f^2$ and, accordingly, is proportional, when the plane is in the neighborhood of the beaconing axis, to the angular divergence between the position of the airplane and the axis of the radio-beacon.

Figure 5:
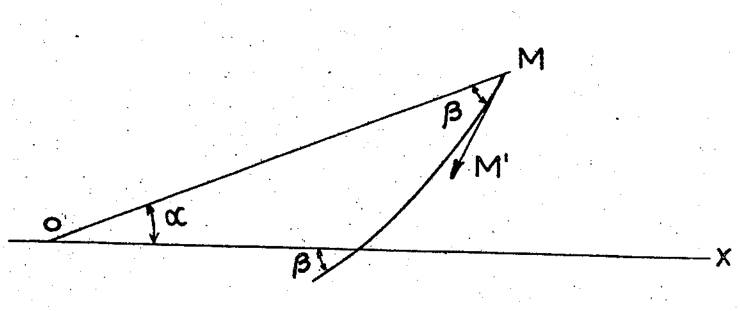
Figure 5 represents the course which the craft would follow if the pilot sets a course which at every moment makes the same angle with the line from the craft to the beacon.

As the heading to be followed by the pilot is defined by the zero position of the pointer of the galvanometer 57, with the arrangement just described, if said heading makes an angle B with the line OM joining the airplane with the radio-beacon, it will make the same angle everywhere and the airplane will describe a logarithmic spiral as shown in Fig. 5.

As a further improvement, the amplification of the tube of the amplifier stage 58, can be varied in order to diminish the angle B in proportion as the plane comes nearer to the beacon axis OX. The bias of said tube 58 can vary, for instance, in the same manner as the mean output voltage delivered from tapped resistor 58*a* by the double diodes 55 and 56. Thus a higher plate voltage delivered by diodes 55 and 56, corresponding to a greater angular divergence $\alpha$ also corresponds a higher negative bias voltage on the grid of amplifier tube 58, that is to say a reduced amplification of the currents of the reversing frequency $f'$. One thus obtains a relative increase of the currents of the reversing frequency $f'$ in proportion as the airplane comes nearer to the beacon axis.

Figure 9:
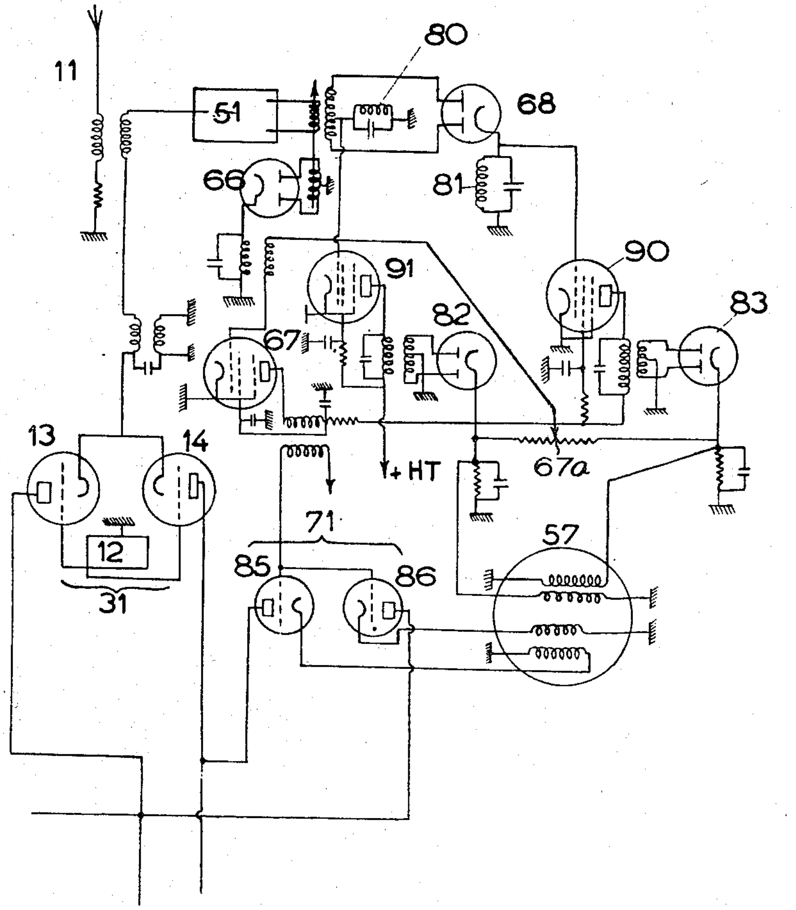

In order to thus diminish the angle B, alternatively, one can also proceed in the following manner for a beacon with double modulation $f^1$ and $f^2$ such as is employed with the apparatus connected as shown in Figure 9:

The electronic change-over switch 31 comprising the two tubes 13 and 14 reverses the phase of the electromotive force of the coil aerial 12 at the reversing frequency $f'$. Thus the input voltage of the amplifier 51 is alternately, as before, the sum and the difference of the electromotive forces in the coil aerial and in the non-directional antenna. At the output of the amplifier 51 a detector diode 66 delivers a voltage of frequency $f'$ amplified by the pentode 67. The detector diode 68 is connected to the tuned circuits 80 and 81 that are tuned to the two frequencies of modulation $f^1$ and $f^2$ respectively. Voltages of the same frequencies appear in the circuits of the diode 68 and the relative values of these voltages vary according to the position of the airplane with respect to the axis of the radio-beacon.

The diodes 82 and 83 detect these alternating voltages after said voltages are amplified and filtered in the stages 91 and 90 respectively. The cathode circuits of said diodes 82 and 83 have a time constant which is greater than the reciprocal of the reversing frequency $f'$ so that the voltages collected on their terminals are practically direct voltages. Said voltages are applied to two differential windings of the indicator galvanometer 57.

In this arrangement of Fig. 9, the voltage of reversing frequency $f'$ amplified by the pentode 67 is transmitted, on the other hand, to the grids of the tubes 85 and 86 which form an electronic change-over switch 71 driven synchronously with the change-over switch 31. The rectified current representing frequency $f'$ delivered from tubes 85 and 86 appears according to its phase either on the cathode of the tube 85 or on the cathode of the tube 86 and thus acts upon respective windings of indicator 87 and upon the pointer of this indicator 87 in one direction or in the other according to its phase, that is to say according to the side of the airplane where the beacon transmitter O lies.

In proportion as the airplane comes nearer to the beacon axis, the radio-beacon effect diminishes and it is necessary to modify the bearing of the airplane in order that the effect due to the reception of the reversing frequency $f'$ shall remain equal to said radio-beacon effect, that is to say one must progressively bring the heading of the airplane into a direction nearer to the beacon axis.

Now, in the system of Fig. 9 just described, the reception of the reversing frequency $f'$ also remains fixed for a given bearing of the airplane regardless of the angular divergence of the position of the airplane with respect to the beacon axis. Owing to this fact, the radio-beacon effect becomes very small with respect to the effect due to the reception of the reversing frequency $f'$ in the neighborhood of the beacon axis. It follows therefrom that the course may have the beacon axis as an asymptote.

In order to remedy this inconvenience, one reduces the amplification of the measured quantity representing the angle B when the airplane comes nearer to the beacon axis.

For this purpose, one controls the amplification of the pentode 67 by its grid bias thru the mean cathode voltage of the diodes 82 and 83. Thus, the amplification increases at the same time as this mean voltage delivered from tapped resistor 67*a* (Fig. 9).

It diminishes, therefore, when said cathode voltage decreases, this is to say when the craft comes nearer to the beacon axis. It will be apparent that I have provided a novel and very useful system of radio guidance which constitutes a marked improvement over systems heretofore available.

To those skilled in the art it will be evident that the system of my invention is susceptible of modifications of certain features without departing from the spirit of my invention, and all such modifications which are comprehended within the scope of the appended claims I consider to be a part of my invention.

I claim:

1. In radio signal responsive course indicating apparatus for use on board mobile craft in receiving signals from a radio beacon having a beacon axis and directively transmitting two radio-frequency signals carrying respectively two different characteristic signal modulations in two differently directed overlapping lobes on respective sides of said beacon axis, a first receiving antenna having a substantially non-directional characteristic, a second directional antenna fixedly mounted on said craft, radio signal receiving means, cyclically operating signal input means comprising a source of reversing frequency and means for cyclically combining alternately in opposed polarity at a determined reversing cyclic frequency the signals received on said first and second antennas and to apply their resultant so combined to the input of said receiving means, means for detecting the output of said receiving means and for separately deriving therefrom a current varying at said reversing cyclic frequency and another current carrying said characteristic signal modulations, a multiple winding current responsive measuring instrument, and a cyclically operating device connected to apply said current varying at said reversing cyclic frequency to one of the windings of said multiple winding current responsive measuring instrument, means for operating said cyclically operating device in synchronism with said cyclically operating signal input means, and connections for applying the current carrying said characteristic signal modulations to another winding of said current responsive measuring instrument.

2. Apparatus as recited in claim 1, said two modulations so carried by said two signals transmitted by said beacon being respectively dash and dot code signals of cyclically repeated determined frequency.

3. Apparatus as recited in claim 1, said two modulations so carried by said two signals transmitted to said beacon being respectively dash and dot code signals of cyclically repeated determined frequency, and a filter unit interposed in the output circuit of said means for detecting and deriving said current carrying said dot and dash modulations, and an amplifier interposed in the connection to said instrument winding from said means for detecting and deriving said current varying at said reversing cyclic frequency, and a connection from one side of said filter unit to a grid of said amplifier for decreasing the negative bias thereof as said derived current carrying said dot and dash modulation decreases as the craft approaches the beacon axis.

4. In radio signal responsive course indicating apparatus for use on board mobile craft in receiving signals from a radio beacon having a beacon axis and directively transmitting two radio-frequency signals carrying respectively two different identifying modulation frequencies in two differently directed overlapping lobes on respective sides of said beacon axis, a first receiving antenna having a substantially non-directional characteristic, a second directional antenna fixedly mounted on said craft, radio signal receiving means, cyclically operating signal input means comprising a source of reversing frequency and means for cyclically combining alternately in opposed polarity at a determined reversing cyclic frequency the signals received on said first and second antennas and to apply their resultant so combined to the input of said receiving means, means for detecting the output of said receiving means and for separately deriving therefrom two separate currents respectively carrying signals of said two different identifying modulating frequencies and also for deriving therefrom a third current varying at said reversing cyclic frequency, a multiple winding current responsive measuring instrument, connections for applying in opposition to respective windings of said instrument said two derived currents respectively carrying signals of said two different identifying modulation frequencies, and connections for applying to other windings of said instrument said third derived current varying at said reversing cyclic frequency.

5. Apparatus as recited in claim 4, and phase responsive cyclic reversing switching means having its frequency positively controlled by said source of reversing frequency and interposed in the path from said detecting and deriving means to said instrument of said current varying at the reversing frequency for controlling the phase of application of said reversing frequency current to said instrument and causing said instrument to positively indicate the phase of said derived current of reversing frequency with reference to the phase of said source of reversing frequency.

6. Apparatus as recited in claim 4, and voltage divider means having a tap for deriving a voltage which is the mean of the output voltages producing said two separate currents respectively carrying signals of said two different identifying modulating frequencies, an amplifier interposed in the connections for applying to other windings of said instrument said third derived current varying at said reversing cyclic frequency, and a connection from said tap of said voltage divider means to a grid of said amplifier for increasing the amplification of said amplifier for a small mean value of said two currents carrying signals of identifying modulations.

7. Apparatus as recited in claim 4, said detecting and deriving means being arranged to first detect and derive said two separate currents respectively carrying signals of said two different identifying modulation frequencies and combining the resultant of the outputs of said two so identified currents and to subsequently detect and derive from said combined resultant the third current varying at said reversing cyclic frequency.

8. Apparatus as set forth in claim 1 further characterized in that the said cyclically operating signal input means and the said cyclically operating device comprise electronic discharge devices having their anodes connected together.

9. A system for radio guiding of aircraft comprising a radio beacon having an antenna system and means for transmitting signal energy to define a beacon axis, receiving apparatus carried by the aircraft for receiving signals transmitted by said radio beacon, said receiving apparatus including a directional antenna and a substantially non-directional antenna, a mixer tube coupled to said substantially non-directional antenna, an electronic phase shifting switch connected between said directional antenna and said mixer tube, means for operating said electronic phase shifting switch at a predetermined frequency so that the signal voltage applied to said mixer tube will be alternately, at said predetermined frequency, equal to the sum and to the difference of the signal electromotive forces developed in said directional antenna and in said substantially non-directional antenna, means for amplifying said signal voltage, a detector for detecting said signal voltage, an electromagnetic device and an indicator controlled thereby, a second electronic phase shifting switch connected between said detector and said electromagnetic device, and connections for operating said second electronic phase shifting switch in synchronism with said first mentioned electronic phase shifting switch in synchronism with said first mentioned electronic phase shifting switch to produce indications in said indicator characteristic of the position of the aircraft with respect to said radio beacon axis.

10. A system for radio guiding of aircraft comprising a radio beacon having an antenna system and means for transmitting signal energy to define a beacon axis, and for transmitting different signals on each side of said beacon axis, receiving apparatus carried by the aircraft for receiving signals transmitted by said radio beacon, said receiving apparatus including a directional antenna and a substantially non-directional antenna, a mixer tube coupled to said substantially non-directional antenna, an electronic phase shifting switch connected between said directional antenna and said mixer tube, means for operating said electronic phase shifting switch at a predetermined frequency so that the signal voltage applied to said mixer tube will be alternately, at said predetermined frequency, equal to the sum and to the difference of the signal electromotive forces developed in said directional antenna and in said substantially non-directional antenna, means for amplifying said signal voltage, a detector for detecting said signal voltage, an electromagnetic device and an indicator controlled thereby, a second electronic phase shifting switch connected between said detector and said electromagnetic device, connections for operating said second electronic phase shifting switch in synchronism with said first mentioned electronic phase shifting switch, and additional connections for supplying the aforesaid different signals from the sides of said radio beacon axis to said electromagnetic device to produce indications in said indicator characteristic of the position of the aircraft with respect to said radio beacon axis.

11. A system for radio guiding of aircraft comprising a radio beacon having an antenna system and means for transmitting signal energy to define a beacon axis, and for transmitting different signals on each side of said beacon axis, receiving apparatus carried by the aircraft for receiving signals transmitted by said radio beacon, said receiving apparatus including a directional antenna and a substantially non-directional antenna, a mixer tube coupled to said substantially non-directional antenna, an electronic phase shifting switch connected between said directional antenna and said mixer tube, means for operating said electronic phase shifting switch at a predetermined frequency so that the signal voltage applied to said mixer tube will be alternately, at said predetermined frequency, equal to the sum and to the difference of the signal electromotive forces developed in said directional antenna and in said substantially non-directional antenna, means for amplifying said signal voltage, rectifier means for rectifying said signal voltage, an electromagnetic device and an indicator controlled thereby, a filter tuned to said predetermined frequency connected to said rectifier means, a second electronic phase shifting switch connected between said filter and said electromagnetic device, and connections for operating said second electronic phase shifting switch in synchronism with said first mentioned electronic phase shifting switch to produce indications in said indicator characteristic of the position of the aircraft with respect to said radio beacon axis.

12. A system for radio guiding of aircraft comprising a radio beacon having an antenna system and means for transmitting signal energy to define a beacon axis, and for transmitting different modulation signals on each side of said beacon axis, receiving apparatus carried by the aircraft for receiving signals transmitted by said radio beacon, said receiving apparatus including a directional antenna and an omni-directional antenna, a mixer circuit coupled to said substantially non-directional antenna, a phase shifting switch connected between said directional antenna and said mixer circuit, means for operating said phase shifting switch at a predetermined frequency so that the switch voltage applied to said mixer circuit will be alternately, at said predetermined frequency, equal to the sum and to the difference of the signal electromotive forces developed in said directional antenna and in said omni-directional antenna, means for amplifying said signal voltage, rectifier means for rectifying said signal voltage, an electromagnetic device and an indicator controlled thereby, a filter tuned to said predetermined frequency connected to said rectifier means, a second phase shifting switch connected between said filter and said electromagnetic device, connections for operating said second phase shifting switch in synchronism with said first mentioned phase shifting switch, and means for applying signals corresponding to said modulation signals to said electromagnetic device to produce indications in said indicator characteristic of the position of the aircraft with respect to said radio beacon.

JOSEPH AICARDI.

REFERENCES CITED

The following references are of record in the file of this patent:

UNITED STATES PATENTS

| Number | Name | Date |
|---|---|---|
| Re. 22,484 | Cooke et al. | May 23, 1946 |
| 2,286,804 | Hooven | June 16, 1942 |
| 2,327,641 | Hooven | Aug. 24, 1943 |
| 2,393,624 | Ferrill, Jr. | Jan. 29, 1946 |
| 2,395,854 | Ferrill, Jr. | Mar. 5, 1946 |
| 2,423,337 | Moseley | July 1, 1947 |

FOREIGN PATENTS

| Number | Country | Date |
|---|---|---|
| 516,567 | Great Britain | Jan. 5, 1940 |